US010031215B1

(12) United States Patent
Hilde

(10) Patent No.: US 10,031,215 B1
(45) Date of Patent: Jul. 24, 2018

(54) PULSE TIMER PROVIDING ACCURACY IN SPATIALLY LOCAL DIMENSIONING AND VISUALIZATION

(71) Applicant: The United States of America as Represented by the Secretary of the Navy, Washington, DC (US)

(72) Inventor: Jeffrey J. Hilde, Onyx, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 459 days.

(21) Appl. No.: 14/970,984

(22) Filed: Dec. 16, 2015

(51) Int. Cl.
*G01S 7/486* (2006.01)
*G01S 17/89* (2006.01)
*G01S 17/42* (2006.01)

(52) U.S. Cl.
CPC ............ *G01S 7/4865* (2013.01); *G01S 17/42* (2013.01); *G01S 17/89* (2013.01)

(58) Field of Classification Search
CPC ......... G01S 7/4865; G01S 17/42; G01S 17/89
See application file for complete search history.

(56) References Cited

U.S. PATENT DOCUMENTS

| 5,216,259 A * | 6/1993 | Stern ...................... G01S 7/487 250/559.38 |
| 2009/0046272 A1* | 2/2009 | Ohishi .................. G01S 7/4818 356/5.01 |
| 2009/0235127 A1* | 9/2009 | Ohishi ................... G01S 7/487 714/700 |
| 2016/0266243 A1* | 9/2016 | Marron ................. G01S 7/4863 |

\* cited by examiner

*Primary Examiner* — Eric L Bolda
(74) *Attorney, Agent, or Firm* — James M. Saunders

(57) ABSTRACT

Embodiments are directed to increasing the accuracy in spatially local dimensioning systems. A pulse timer generates a sine wave, a cosine wave, a sine wave indexer, and a cosine wave indexer. An outgoing laser pulse transmission to an object and a return bounce back from the object are detected and the outgoing and return bounce back times recorded. The recorded times are used to determine weighted times for the sine and cosine waves. Both the distance and timing to the object are electronically determined.

10 Claims, 8 Drawing Sheets

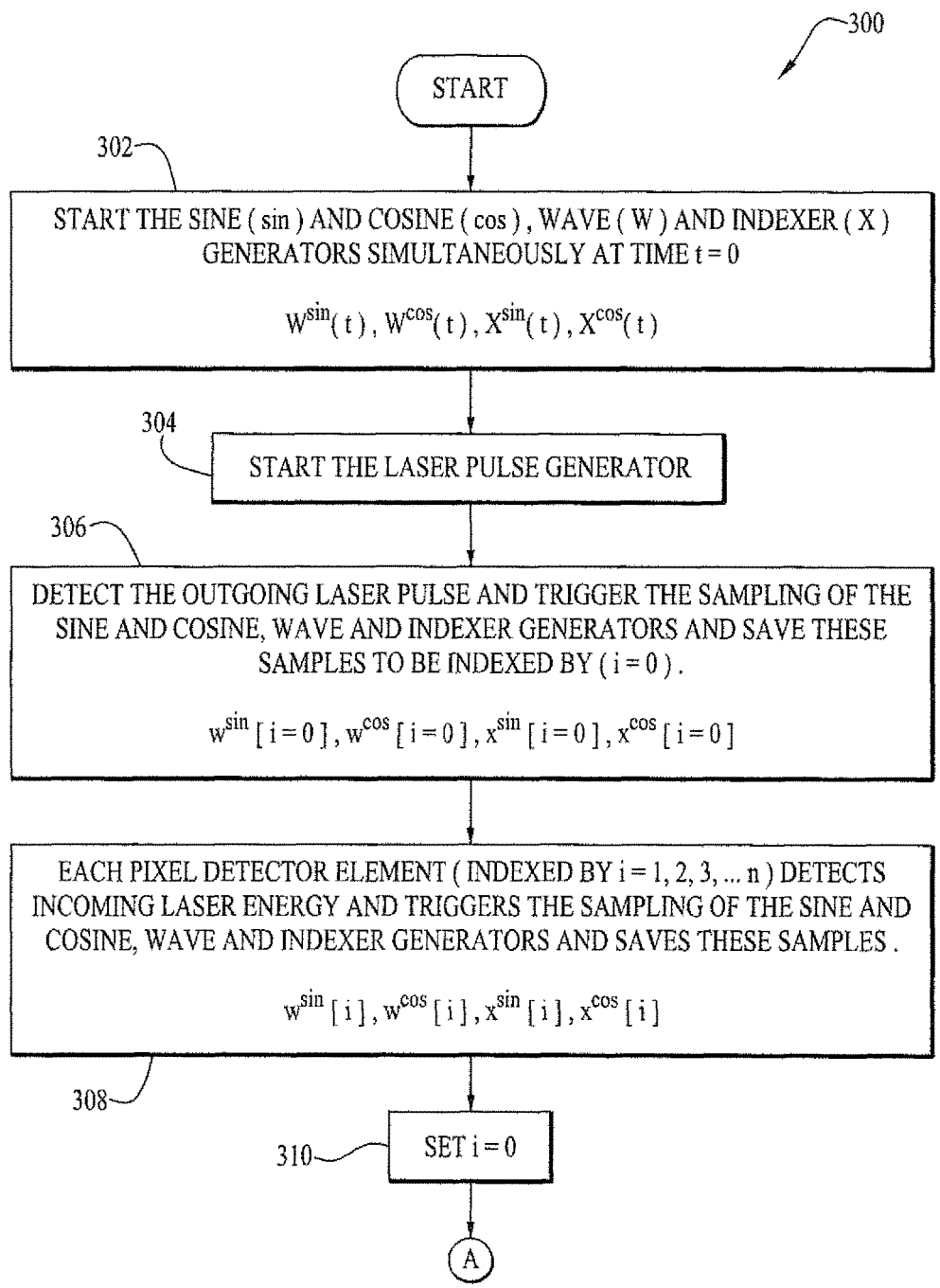

# PULSE TIMER PROVIDING ACCURACY IN SPATIALLY LOCAL DIMENSIONING AND VISUALIZATION

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

Embodiments of the invention generally relate to active sensor(s) three-dimensional data accuracy and, more particularly, the timing of energy pulses associated with the sensor(s).

BRIEF DESCRIPTION OF THE DRAWINGS

FIGS. 3A & 3B are exemplary block process diagrams, according to some embodiments of the invention.

Figure 1:
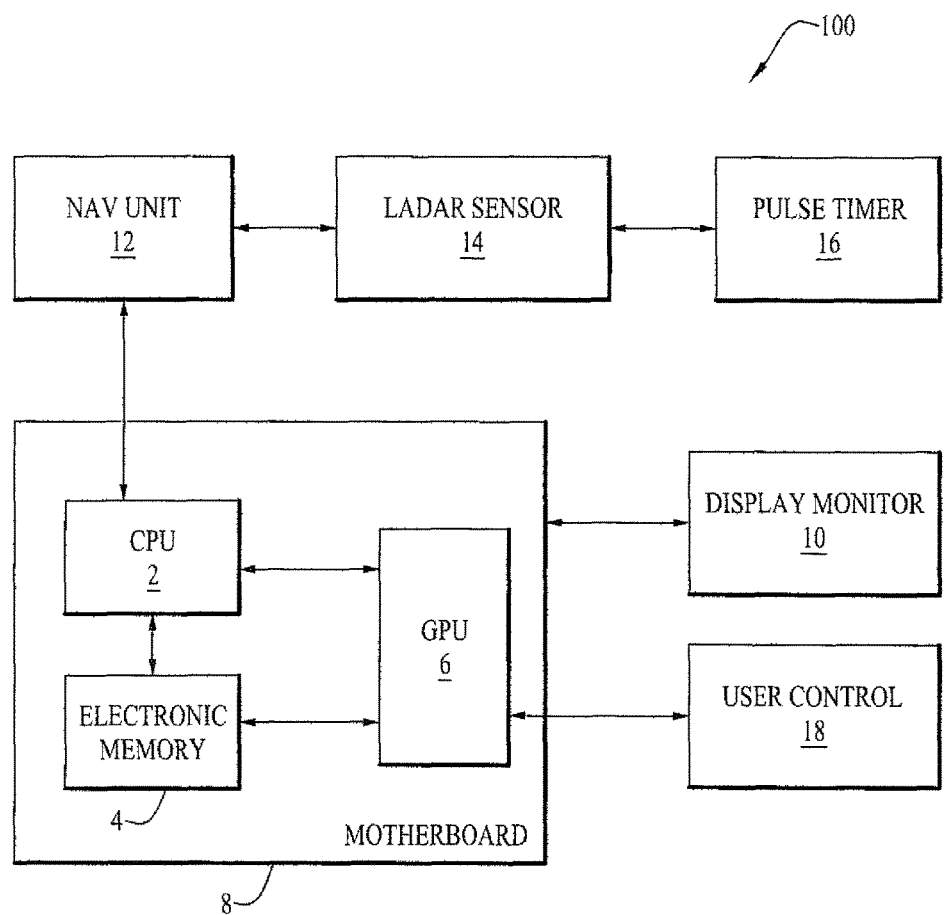
FIG. 1 illustrates components of some systems and/or articles of manufacture, according to some embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Embodiments of the invention generally relate to active sensor(s) three-dimensional data accuracy and, more particularly, the timing of energy pulses associated with the sensor(s). Embodiments of the invention are particularly well-suited for handling LADAR and LIDAR three-dimensional data, which is especially useful where accuracy in the three-dimensional shape of the data is needed. Accurate relative timing may be especially useful in target finding, tracking, and recognition systems.

Embodiments of the invention provide accurate relative timing that is valuable accurate spatially local dimensioning or positioning of points within a point cloud of LADAR data. Current methods are susceptible to timing signal amplitude, period, and phase errors. These errors can cause timing errors that are not distributed evenly along the entire time window of interest, resulting in ambiguities that cause discontinuities in measured time with respect to actual time and, therefore, distortions of the positions calculated for the points of a LADAR point cloud.

Examples of the discontinuities are observed in current methods where linear ramps are employed. The linear ramps are waves that get sampled, digitized, and converted to time and distance. The ramps have to repeat in a saw tooth fashion, which causes a discontinuity. One having ordinary skill in the art will recognize that that saw tooth waves are not smooth, hence the name "saw tooth." The discontinuity in saw tooth waves is avoided by choosing between two different linear ramps. However, the choice is a discontinuity in itself, which continues the error such that the relative error is all within a LADAR point cloud. Therefore, this leads to an inability to perfect shape matching.

Embodiments of the invention address the timing signal errors by distributing the effect of the errors over a much longer time period by choosing waves without discontinuities. The embodiments of the invention selected waves are smooth, continuous waves. Embodiments of the invention do not choose one wave over the other (sometimes referred to as "jumping"), but instead weights one wave in, while weighting another wave out. The distribution produces the result that a collection of timings that are similar in magnitude all have the same timing error and thus, relative to each other, are substantially free of that error.

Embodiments of the invention provide a unique solution for the measurement of time, a timer device, and method for determining the time of each trigger amongst a plurality of triggers. This produces a collection of timings where high relative timing accuracy amongst the collection of timings is desired. Embodiments of the invention provide for an absolute range error reduction of about 30 percent. However, what may be an even greater takeaway is that embodiments of the invention nearly eliminate the relative (pixel to pixel) timing errors, resulting in superior local dimensioning and visualization. Additionally, this feature enables shape matching with three-dimensional models for recognition and identification.

Embodiments of the invention have two main parts. The first part includes a sine wave, cosine wave, an indexer for the sine wave, and an indexer for the cosine wave. The period and amplitude for the two waves are pre-determined to be the same and the waves are started with the same phase such that as one wave crosses zero, the other wave peaks. The first part is started or reset by restarting the sine and cosine waves at zero phase and resetting the indexers to zero, which is the beginning time from which subsequent and multiple trigger times will be measured. As the waves cycle through their time periodic forms, the indexers increment when their respective wave passes through an amplitude extremum. The waves continue undisturbed until the indexers reach its pre-determined maximum count and timings are no longer possible. A reset of the waves and indexers is performed to start the timer over.

The second part is the sampling of the waves and indexers when triggered and a conversion of the samples into time. The sampling obtains the magnitude (amplitude) of the waves and indexers. When the timer is triggered, a sample for each of the waves and indexers is taken and is then available for conversion to time as follows. A time for the sine wave is computed by taking the arc sine of the sine wave sample and multiplying this by a scaling factor. A bias is added. The scaling factor and bias are found in a calibration table using the sine wave index. Similarly, a time for the cosine wave is determined. Each time is then multiplied by` a weighting factor computed as one minus the wave sample squared. The final time, which may also be referred to as the computed time of the event that originally caused the trigger to signal sampling, is obtained from the sum of these weighted times.

At the outset, it is helpful to describe various conventions, parameters, and terminology associated with embodiments of the invention.

Pulse Timer

The pulse timer, as shown in FIG. 1, reference character 16, is associated with a LADAR sensor, reference character 14. The pulse timer 16 may sometimes be referred to as the "device," the "timer," the "timer device," or similar without detracting from the merits or generalities of embodiments of the invention. The pulse timer 16 is part of the electronic circuitry of the LADAR sensor 14.

Trigger

The Trigger (shown in FIG. 2, reference character 202) is a signal that causes the Sine Wave, Sine Indexer, Cosine Wave, and Cosine Indexer to be sampled so that a time can be determined for a laser pulse return. The trigger comes from the LADAR sensor 14 and is an independent event occurring at laser pulse transmission and return. When the laser pulse (generated by a laser pulse generator) is transmitted, the pulse goes by a detection device on its way out, which causes a first trigger (a first triggering event). When a photo element receives the return energy (sometimes referred to as bounce back) a second trigger (second triggering event) is initiated. The photo element may have an array of detector elements, with each of the detectors triggering independently from each other. Thus, the LADAR detector element has determined that return laser energy has been detected and then initiates a Trigger (the second trigger) to obtain a time for this event. The second trigger may be referred to as a receiving trigger. The receiving trigger causes sampling to occur. As such, the trigger is an external input to the pulse timer 16.

Sine Wave

Figure 4:
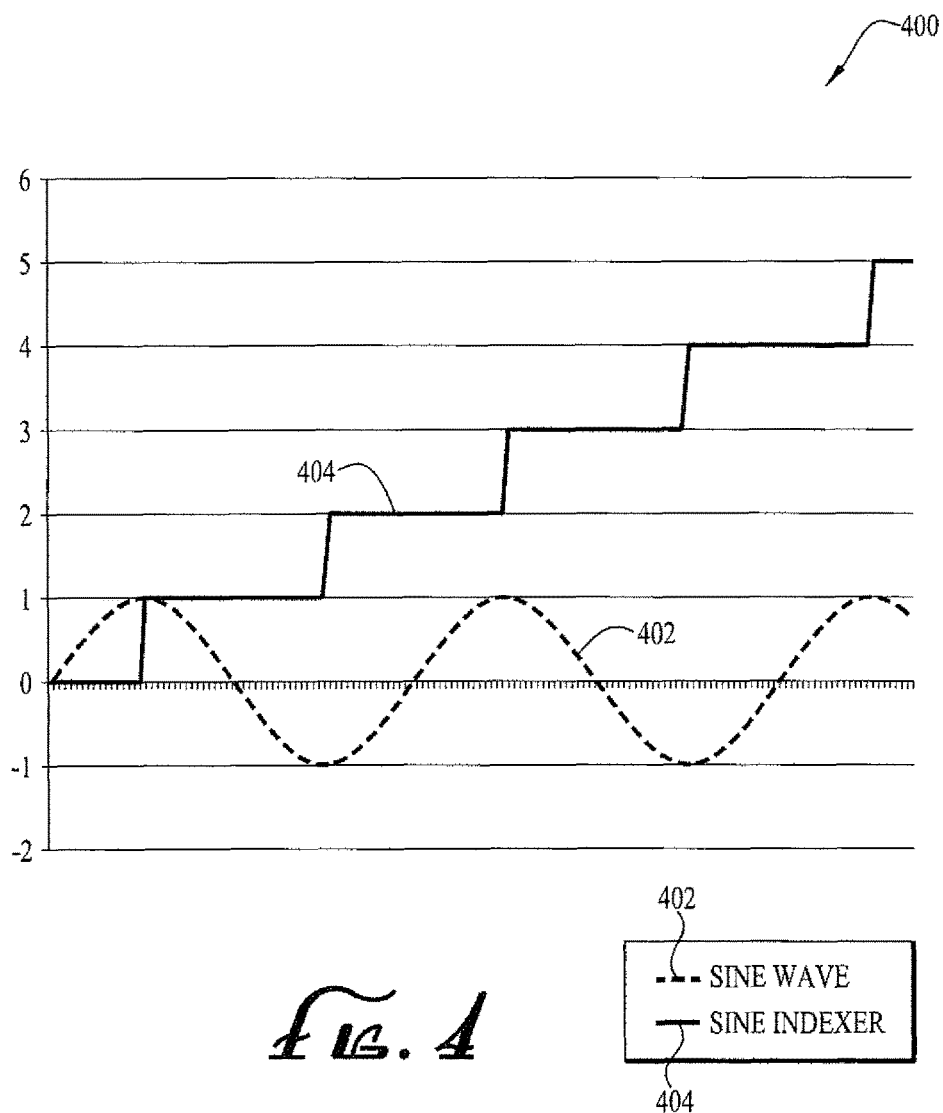
FIG. 4 is an exemplary graphical representation of a sine wave and sine indexer, according to some embodiments of the invention.

The Sine Wave is an analog signal that is available for sampling upon a Trigger and is shown in FIG. 4 (reference character 402) along with the Sine Indexer (reference character 404). The sine wave 402 is produced by an analog circuit in the pulse timer 16.

Sine Indexer

The Sine Indexer (shown graphically as reference character 404 in FIG. 4) is a digital counter (a digital circuit) that starts at zero, is sync with the sine wave 402, and is calibrated to increment with the Sine Wave magnitude extremum. The Sine Wave Indexer 404 is a digital circuit that is internal to the pulse timer 16 and is in sync with the Sine Wave 402. Stated another way, the Sine Indexer 404 produces an electrical signal with a magnitude that increases with time and is directly linearly proportional to the count of the number of extremum in the sine wave 402. The Sine Wave 402 and Sine Indexer 404 coordinate as shown in FIG. 4.

Cosine Wave

Figure 5:
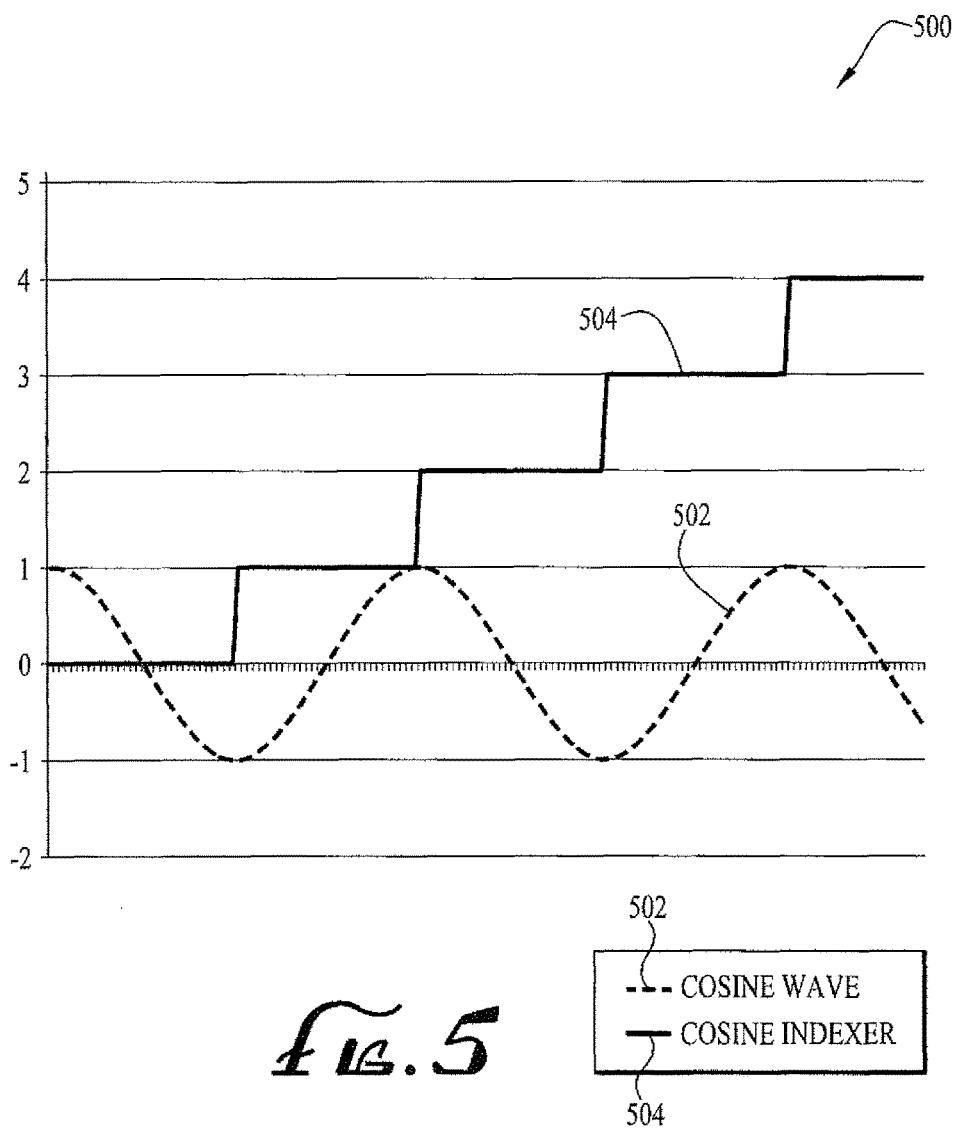
FIG. 5 is an exemplary graphical representation of a cosine wave and cosine indexer, according to some embodiments of the invention.

The Cosine Wave is an analog signal that is available for sampling upon a Trigger and is depicted as reference character 502 in FIG. 5. The cosine wave 502 is produced by an analog circuit in the pulse timer 16 and is 90 degrees out of phase with the Sine Wave 402.

Cosine Indexer

The Cosine Indexer is depicted as reference character 504 in FIG. 5 and is a digital counter in sync with the cosine wave 502, starts at zero and is calibrated to increment with the Cosine Wave magnitude extremum. Stated another way, the Cosine Indexer 504 produces an electrical signal with a magnitude that increases with time and is directly linearly proportional to the count of the number of extremum in the Cosine Wave 502. The Cosine Wave 502 and Cosine Indexer 504 coordinate as shown in FIG. 5.

Internal and Free-Running

The sine wave 402, cosine wave 502, sine wave indexer 404, and cosine wave indexer 504 are internal and free-running. This means that there is not an external stimulus to change course of phase or magnitude to change them. The particular wave is precisely known with respect to time and magnitude.

Sine Wave Sample

The Sine Wave Sample is the magnitude of the Sine Wave 402 at the time of the Trigger. The Sine Wave Sample is used to determine the Arc Sine and the Sine Weight.

Arc Sine

The Arc Sine is a quantity determined from the Sine Wave Sample by applying the mathematical inverse of the Sine Wave function known as the arc sine to the Sine Wave Sample.

Sine Weight

The Sine Weight is determined from the Sine Wave Sample by taking one minus the quantity of the Sine Wave Sample magnitude squared.

Cosine Wave Sample

The Cosine Wave Sample is the magnitude of the Cosine Wave 502 at the time of the Trigger and is used to determine the two quantities, the Arc Cosine and the Cosine Weight.

Arc Cosine

The Arc Cosine is a quantity determined from the Cosine Wave Sample by applying the mathematical inverse of the Cosine Wave function known as the arc cosine to the Cosine Wave Sample.

Cosine Weight

The Cosine Weight is determined from the Cosine Wave Sample by taking one minus the quantity of the Cosine Wave Sample magnitude squared.

Scale & Bias

Figure 6:
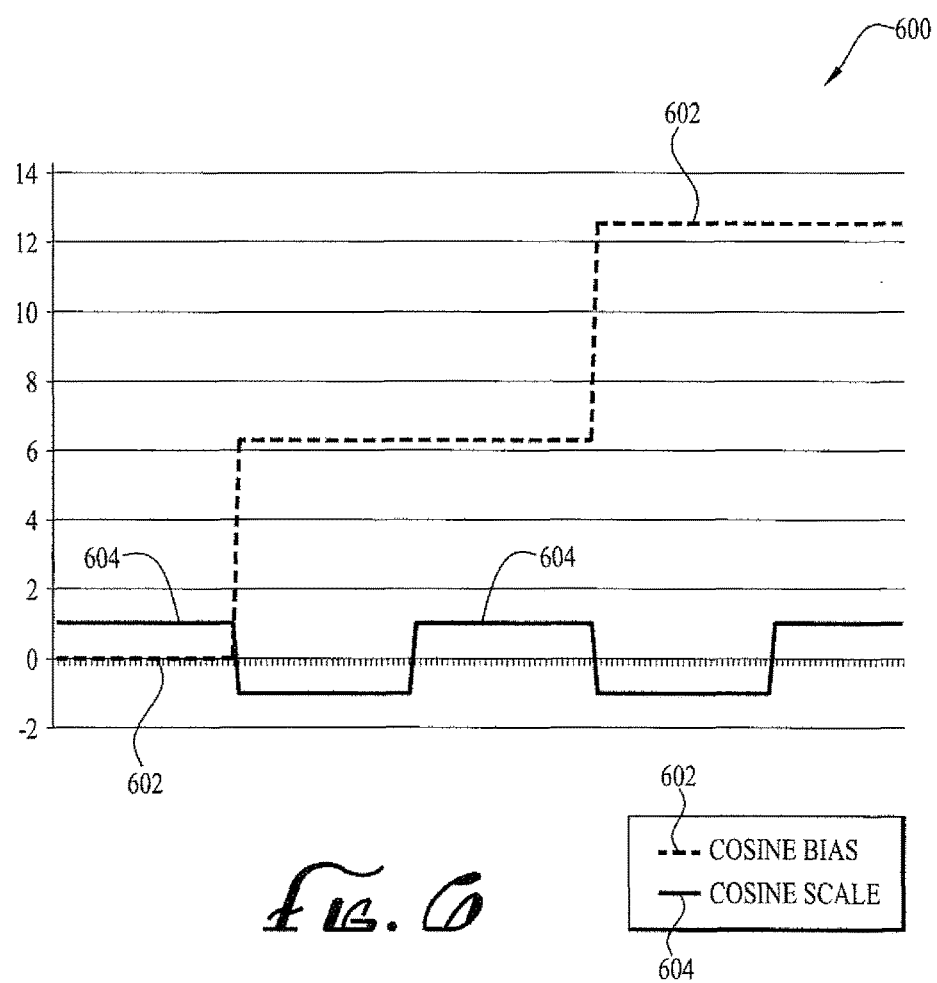
FIG. 6 is an exemplary graphical representation of a cosine bias and cosine scale, according to some embodiments of the invention.

The Scale & Bias are functions of the Indexers (the sine and cosine indexers 404 & 504) with values chosen to transform the arc quantity (the Arc Cosine or the Arc Sine) into linear time and in the units desired. FIG. 6 illustrates an exemplary graphical representation of the Cosine Bias (reference character 602) and Cosine Scale (reference character 604). FIG. 6 illustrates an example for the transform applied to the Arc Cosine and shown for Cosine Indexer values zero through five. The Cosine Scale 604 is 1.0 in magnitude and changes sign with each Cosine Indexer 504 value increment.

Figure 7:
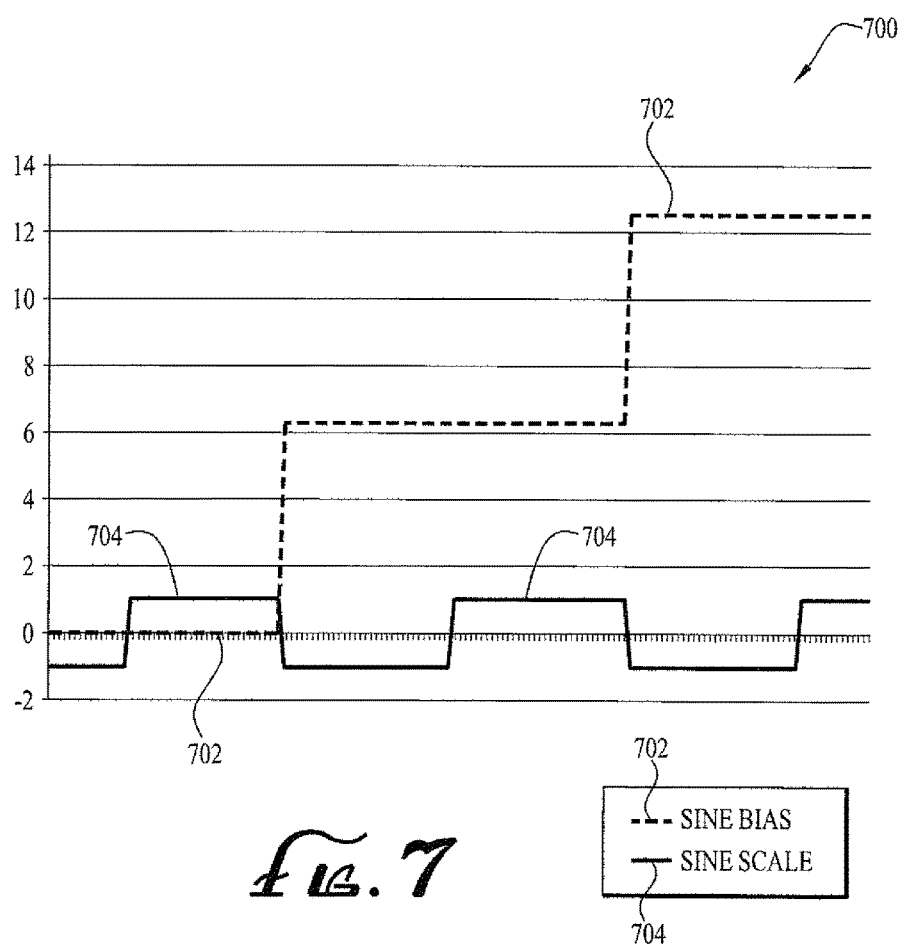
FIG. 7 is an exemplary graphical representation of a sine bias and sine scale, according to some embodiments of the invention.

FIG. 7 illustrates an exemplary graphical representation of the Sine Bias (reference character 702) and Sine Scale (reference character 704). FIG. 7 illustrates an example for the transform applied to the Arc Sine and shown for the Sine Indexer values zero through six. The Sine Scale 704 is 1.0 in magnitude and changes sign with each Sine Indexer 404 value increment.

The transformation equations are given as:

Sine Time=Sine Bias+Sine Scale(Arc Sine)

Cosine Time=Cosine Bias+Cosine Scale(Arc Cosine)

Cosine Weighted Time

The Cosine Weighted Time is the Cosine Time multiplied by the Cosine Weight.

Sine Weighted Time

The Sine Weighted Time is the Sine Time multiplied by the Sine Weight.

Time

The Time is the sum of the Sine Weighted Time and the Cosine Weighted Time and is the final determined time for the time of the Trigger.

LADAR Sensor

The LADAR Sensor (reference character 14 in FIG. 1) is an actual physical sensor that produces a LADAR Point Cloud. A LADAR Sensor flash (F) is a data type F holding information related to the LADAR sensor flash. This includes all of the points (P) collected at time $F_t$. Time $F_t$ is the time that the points for a flash were collected by the LADAR sensor.

LADAR Point Cloud

The LADAR Point Cloud is a collection of three-dimensional points produced by the LADAR Sensor, where these points are on a scene surface.

Point

A Point is one element of a Point Cloud having three-dimensional $$\begin{bmatrix} L_x \\ L_y \\ L_z \end{bmatrix}$$

Cartesian coordinates and after being transformed by, for example, a fusion matrix, has additional dimensions row, column, and depth (r, c, d) and is fused or marked with color intensity($I_{r,c}$). The point may also be shown by $$\begin{bmatrix} P_x \\ P_y \\ P_z \end{bmatrix}.$$

Control

Control is provided by a viewing human operator of some process that manipulates a control camera (a user camera) parameters to achieve visual verification, if desired, on a display screen.

Apparatus/System Embodiments

With reference to FIG. 1, apparatus/system embodiments are collectively shown as reference character 100 and include a Central Processing Unit (CPU) 2 (also referred to herein as a control processing unit) operatively associated with electronic memory 4 and a graphics processing unit (GPU) 6, operatively associated with a display monitor 10, to display a visual depiction of the dimensioning and timing associated with a target. The CPU 2 is the hardware within a computer that carries out the instructions of a computer program by performing the basic arithmetic, logical, and input/output operations of the system. The CPU 2 is operatively associated with memory 4, which includes data and stored instructions. The CPU 2 and memory 4 are both operatively associated with the GPU 6. The GPU 6, also known as a visual processing unit (VPU), is a specialized electronic circuit constructed to rapidly manipulate and alter memory to accelerate the building of images in a frame buffer intended for output to a display. The memory 4 receives input, and stores software, which the CPU 2 and GPU 6 use to perform the processes described herein.

Reference character 8 designates a motherboard, to which the CPU 2, memory 4, and GPU 6 are electrically associated. Reference character 10 is the visual display monitor (screen) to display a visual depiction of the targeting information, such as position, orientation, and timing information. In some applications, depending on the verification requirements, a visual verification by a user is important to provide an additional layer of validation before acting on the processing result (for example dedicating resources to a specific location based on the processing result). Some embodiments, therefore, include the display monitor 10, which is sometimes referred to as a visual display screen.

Reference character 12 is a navigation unit such as, for example, one associated with an airborne vehicle, spacecraft vehicle, and water-based vehicle in fresh water, sea, or littoral regions. The navigation unit 12 is associated with a LADAR sensor 14, configured to receive signals. The navigation unit 12 is configured to communicate with the CPU 2. Reference character 16 is a pulse timer and is associated with the LADAR sensor 14.

Reference character 18 is a user control, sometimes referred to as a virtual control camera, control camera, or simply a camera. The user control 18 may be especially useful in situations where visual verification of an object, such as a target, is important. The user control 18 of the position and orientation of a control camera is provided such that the position and orientation can be used to compute a control matrix. The control camera 18 is controlled by user input and can be used to obtain the desired points of view for visualization. The control camera 18 could simply be referred to as a camera. In some embodiments, the control camera 18 is referred to as a virtual control camera which means a camera having a mathematical position and orientation. The control camera can also be a digital camera. Additionally, it should be noted that the control camera 18 can also be physical sensors (actual cameras as opposed to virtual cameras).

Article of Manufacture Embodiments

Article of manufacture embodiments are directed to non-transitory processor readable medium(s) having stored thereon processor executable instructions that, when executed by the processor(s), cause the processor to perform the process(es) described herein. The term non-transitory processor readable medium include one or more non-transitory processor-readable medium (devices, carriers, or media) having stored thereon a plurality of instructions, that, when executed by the electronic processor (typically a central processing unit—an electronic circuit which executes computer programs, containing a processing unit and a control unit), cause the processor to process/manipulate/act on data according to the plurality of instructions (defined herein using the process/function form). The non-transitory medium can be any non-transitory processor readable medium (media), including, for example, a magnetic storage media, "floppy disk," CD-ROM, RAM, a PROM, an EPROM, a FLASH-EPROM, any other memory chip or cartridge, a file server providing access to the programs via a network transmission line, and a holographic unit. Of course, those skilled in the art will recognize that many modifications may be made to this configuration without departing from the scope.

In some apparatus/system embodiments, the electronic processor is co-located with the processor readable medium. In other system embodiments, the electronic processor is remotely located from the processor readable medium. It is noted that the steps/acts/tasks/processes described herein including the figures can be interpreted as representing data structures or sets of instructions for causing the computer readable medium to perform the step/act/process. Embodiments display dimensioning and timing information associated with the target on a visual display screen, which allows for visual verification by a user.

Certain embodiments of the invention may take the form of a computer program product on a computer-usable storage medium having computer-usable/readable program instructions embodied in the medium. Any suitable computer readable medium may be utilized including either computer readable storage media, such as, for example, hard disk drives, CD-ROMs, optical storage devices, or magnetic storage devices, or a transmission media, such as, for example, those supporting the internet or intranet.

Computer-usable/readable program instructions for carrying out operations of embodiments of the invention may be written in an object oriented programming language such as, for example, Python, Visual Basic, or C++. However, computer-usable/readable program instructions for carrying out operations of embodiments of the invention may also be written in conventional procedural programming languages, such as, for example, the "C#" programming language or an engineering prototyping language such as, for example, MATLAB®. Embodiments of the invention may also employ a multi-platform application programming interface, such as Open Graphics Library (OpenGL). The computer-usable/readable program instructions may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider or any other method known in the art).

Embodiments of the invention are described in part below with reference to flow chart illustrations and/or block diagrams of methods and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable memory, including RAM, that can direct a computer or other programmable data processing apparatus to function in a particular manner, such that the instructions stored in the computer-readable memory produce an article of manufacture including instructions that implement the function/act specified in the flow chart and/or block diagram block or blocks.

These computer program instructions may also be loaded onto a computer or other programmable data processing apparatus to cause a series of operational tasks to be performed on the computer or other programmable apparatus to produce a computer implemented process such that the instructions that execute on the computer or other programmable apparatus provide tasks for implementing the functions/acts specified in the flow chart and/or block diagram block or blocks.

In the accompanying drawings, like reference numbers indicate like elements. FIG. 1 illustrates the components of some systems and/or articles of manufacture, according to embodiments of the invention. Reference character 100 depicts an apparatus of embodiments of the invention. The individual components depicted in FIG. 1 function together to perform the disclosed methods.

Figure 2:
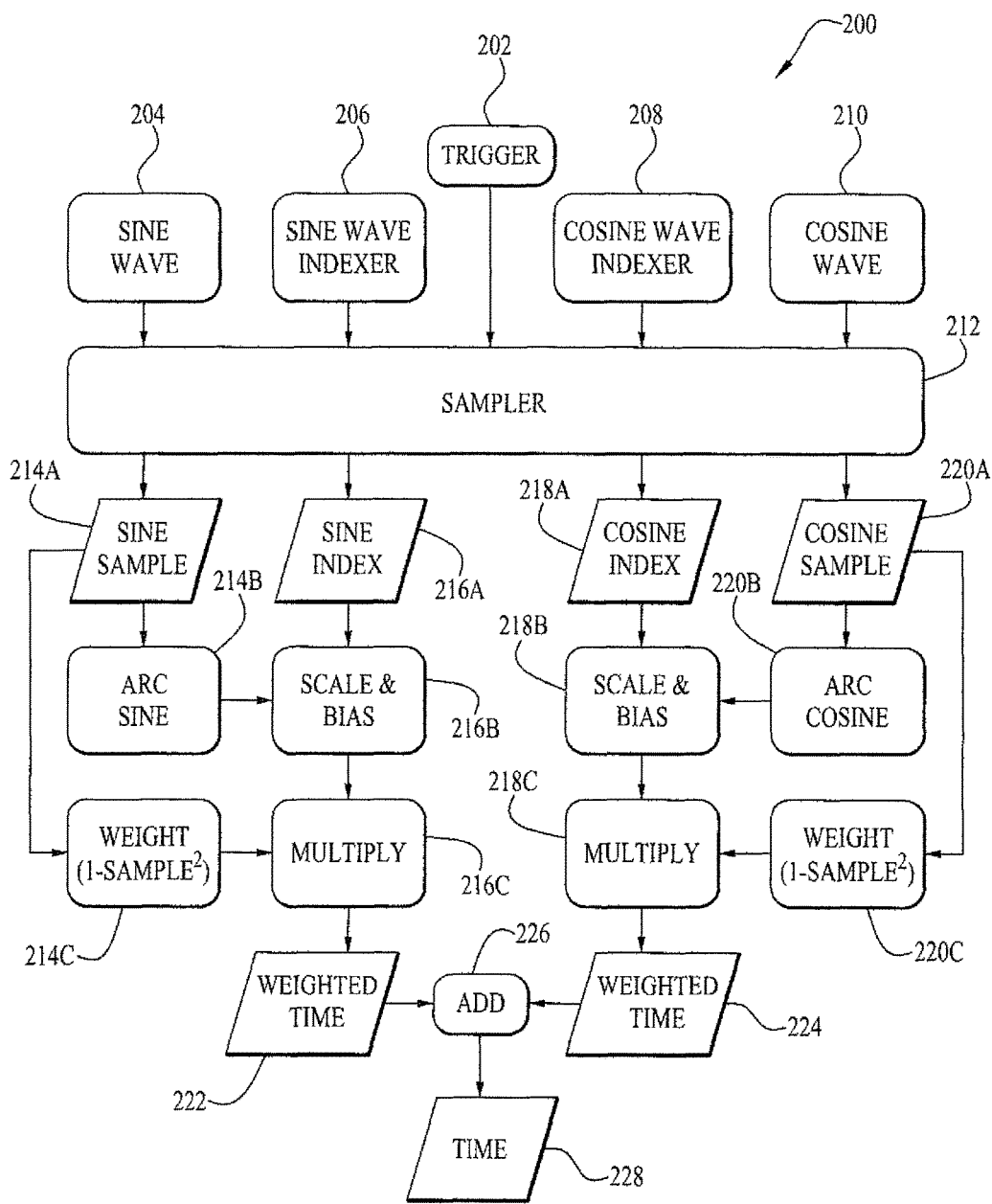
FIG. 2 is an exemplary block process diagram, according to some embodiments of the invention.
Figure 3B:
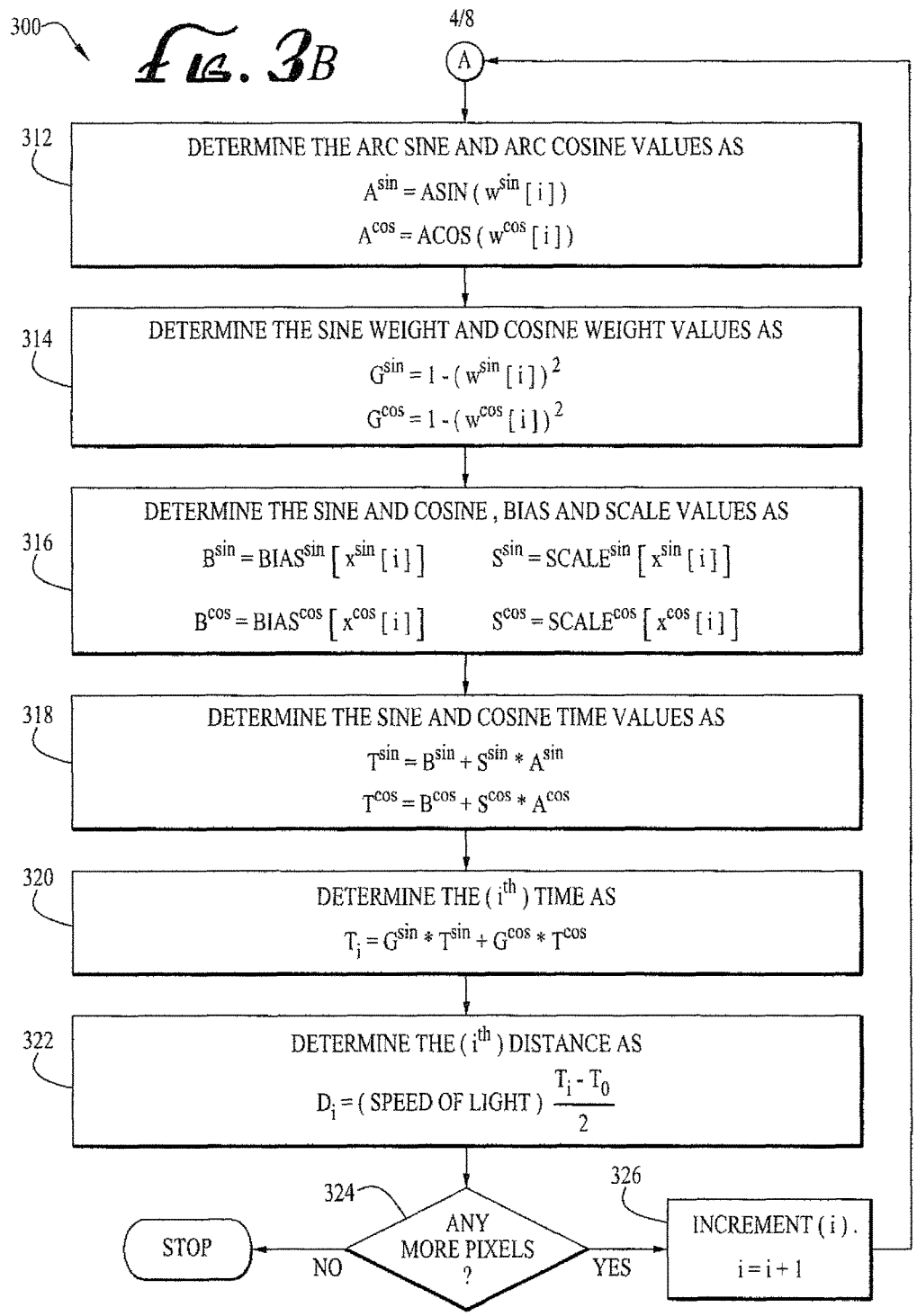

FIGS. 2, 3A, & 3B are block process diagrams (flow charts), according to some embodiments of the invention. In particular, the figures relate to reducing range error to improve accuracy in spatially local dimensioning. FIGS. 2, 3A, & 3B are equally applicable to method and article of manufacture embodiments. All signals discussed herein are non-transitory. FIGS. 4 through 7 are exemplary graphical illustrations, associated with some embodiments of the invention. In FIGS. 4 through 7, the x-axis denotes time increments in seconds, milliseconds, or any variation based on application-specific conditions. The y-axis in FIGS. 4 through 7 denotes amplitude and magnitude.

FIG. 2 illustrates an overall flow chart for some embodiments of the invention. FIG. 2 depicts the components that work together to give the time of the event that triggered the timer. Processes are depicted as rectangles (see, for example, reference characters 202, 204, 206, 208, 210, 212, 214B, 214C, 216B, 216C, 218B, 218C, 220B, 220C, and 226). Data structures are depicted as parallelograms (see reference characters 214A, 216A, 218A, 220A, 222, 224, and 228).

Referring to FIG. 2, there are five inputs to the method of this technology: (1) the Sine Wave 204; (2) the Cosine Wave 210; (3) the Sine Wave Indexer 206; (4) the Cosine Wave Indexer 208; and (5) the Trigger 202 that signals the Sampler 212 to take four samples. The Sampler 212 is part of the LADAR sensor and each detection element in the sensor has an analog voltage sampler for the sine and cosine waves 204 & 210 and a digital voltage sampler for the sine wave indexer 206 and the cosine wave indexer 208. The four samples are: (a) the Sine sample 214A, an amplitude of the Sine Wave 204; (b) the Cosine Sample 220A, an amplitude of the Cosine Wave 210; (c) the Sine Index 216A, an index of the Sine Wave Indexer 206; and (d) the Cosine Index 218A, an index of the Cosine Wave Indexer 208.

The receiving trigger 202 causes sampling to occur. The trigger 202 inputs to a sampler 212. The sampler 212 samples four inputs—the Sine Wave 204, the Sine Wave Indexer 206, the Cosine Wave 210, and the Cosine Wave Indexer 208. The Sampler 212 outputs the samples as the Sine Sample 214A, the Sine Index 216A, the Cosine Index 218A, and the Cosine Sample 220A.

The Sampler 212 converts analog signals to digital signals. Sampling can occur in analog and then be converted to digital. Therefore, the outputs 214A, 216A, 218A, and 220A are in digital. For the indexers 206 & 208, the sampler 212 would simply copy the indexer because the indexers are digital counters. Reference character 308 in FIG. 3A is directed to the detector elements that create the triggers (reference character 202 in FIG. 2) when return energy bounces back.

The periods of the Sine Wave 204/402 and the Cosine Wave 210/502 are equal. The Cosine Wave 210/502 is 90 degrees out of phase with the Sine Wave 204/402 as by definition. The Sine Wave Indexer 206/404 increments each time the Sine Wave 204/402 passes through an extremum. The Cosine Wave Indexer 208/504 is similarly defined. The Sine Sample 214A and the Sine Index 216A make a pair, and the Cosine Sample 220A and the Cosine Index 218A make a similar pair. Each pair is processed and results in a Weighted Time 222/224. The two times are summed 226 giving the Time 228 of the Trigger signal.

The processing for each pair is as follows. First, the Sine Sample 214A is converted to time by taking its Arc Sine 214B and a Weight 214C is computed as one minus the Sample squared. Next, using a Scale and Bias 216B, as found in a pre-determined table (a calibration table) at the table location indicated by the Sine Index 216A, the time is scaled and shifted. The calibration table is stored in electronic memory (reference character 4 of FIG. 1). The scaled and shifted time is then multiplied 216C by the Weight factor to give a Weighted Time. Similarly, the Cosine Sample 220A and Index 218A are processed to give a Weighted Time 224. Finally, the Weighted Times 222/224 are summed 226 giving the computed Time 228 of the event that originally caused the Trigger 202 to signal the Sampler 212 to sample the Waves and Indexers (204, 206, 208, & 210) giving the samples used to compute the time. Table 1 is an illustration of a partial calibration table for the Cosine example.

TABLE 1

Example Calibration Table for the Cosine Example.

| Indexer | Scale | Bias |
|---|---|---|
| 0 | +1 | 0 |
| 1 | −1 | 1 |
| 2 | +1 | 1 |
| 3 | −1 | 2 |
| 4 | +1 | 2 |

In Table 1, the Scale is the negative of the sign of the derivative of the wave (for sign or cosine) and flips sign with every extremum of the wave or every increment of the indexer. The Bias starts at zero and increments by the period of the wave at each wave minimum. Lookup tables associated with embodiments of the invention are built using the algorithms disclosed herein.

Embodiments of the invention record first and second triggering event times, which can be used for various targeting and identification processes, such as in shape-matching applications. To display the time and distance, the distances are associated with the angle-angle information that is true for the laser energy that produces the distances associated with task 322 in FIG. 3B. This information can be used in producing a LADAR point cloud, which can be rotated and visually investigated, as well as used in further applications, including automated processes using the information such as, for example, shape-matching applications.

Embodiments of the invention are described as an apparatus and method that provides for the time of the event triggering the timer, where: (1) the three-dimensional data is provided by the LADAR sensor 14; (2) the relative position and orientation of the sensor(s) is known or discovered; and (4) both the LADAR sensor 14 and pulse timer 16 collect data on the same surfaces. However, even though described using a LADAR sensor 14 and pulse timer 16, this technology includes the substitution of any sensor capable of three-dimensional data collection.

Embodiments of the invention are directed to enhancing the recognition of objects in the sensor data for either human operators (visualization) or automatic recognition methods (processing) or other valuable purposes. The LADAR sensor 14 and the pulse timer 16 position and orientation are known or determined separately from this technology.

Although embodiments of the invention are described in considerable detail, including references to certain versions thereof other versions are possible. Examples of other versions include performing the tasks in an alternate sequence or hosting embodiments on different platforms. Therefore, the spirit and scope of the appended claims should not be limited to the description of versions included herein.

FIGS. 3A and 3B a block process diagram of increasing the accuracy in spatially local dimensioning for the visual verification of target recognition using a non-transitory computer readable medium, as depicted by reference character 300. The shown method is equally applicable for target finding as well as target tracking. The process includes providing a system to find, track, and recognize a target.

The system includes a control processing unit (CPU) having electronic memory. A graphics processing unit (GPU) is provided and is electronically connected to the CPU. A LADAR sensor is provided. The LADAR sensor is associated with a navigation unit that is configured to communicate with the CPU. The LADAR sensor has a fusion point cloud of points (P).

A pulse timer is associated with the LADAR sensor. The pulse timer has position and orientation geometry relative to the LADAR sensor. As shown in task 302, simultaneously, at time $T_0=0$, the pulse timer generates a sine wave as a function of time ($W^{sin}$ [t]), a cosine wave as a function of time ($W^{cos}$ [t]), a sine wave indexer as a function of time ($X^{sin}$ [t]), and a cosine wave indexer ($X^{sin}$ [t]) as a function of time.

A laser pulse generator generates a laser pulse at a target (task 304). A laser pulse generator is well-known in the art and is, therefore, not shown in the figures for ease of view. In embodiments, the laser pulse generator is positioned near the LADAR sensor 14 optics and has position geometry relative to the LADAR sensor. The laser pulse has an outgoing laser pulse transmission and a laser bounce back from the target. Time $T_0$ is the time of the outgoing laser pulse transmission.

In task 306, the sampling is triggered with the outgoing laser pulse. In task 308, the samplings are triggered with the incoming energy focused for each of the detection elements. Task 310 (FIG. 3A) begins the sequential process following on FIG. 3B by setting the iteration at zero on the first iteration of tasks 312 through 324 (even-numbered reference characters in FIG. 3B).

The detection of the outgoing laser pulse transmission causes a first triggering event and triggers the sampling of the sine and cosine waves as well as the sine wave indexer and the cosine wave indexer. The samples are saved and indexed by pixel (i). The sine wave samples are designated, in the initial iteration, by $w^{sin}$ [i=0]. Similarly, the cosine wave samples, sine wave indexer samples, and cosine wave indexer samples are designated, in the initial iterations, by $w^{cos}$ [i=0], $x^{sin}$ [i=0], and $x^{cos}$ [i=0], respectively. The receiving (detection) of the return energy bounce back from the target is detected with photoelements in the LADAR sensor, indexed by pixel detector element. Stated another way, the sensor receives the return energy back from the target and is focused for detection on the photodetection elements. The LADAR sensor initiates the second triggering event, which causes sampling to occur and the samples to be saved in electronic memory as $w^{sin}$ [i] for the sine wave sample, $w^{cos}$ [i] for the cosine wave sample, $x^{sin}$ [i] for the sine wave indexer sample, and $x^{cos}$ [i] for the cosine wave indexer sample. The second triggering event time is obtained and may be designated as time $T_i$.

The method 300 continues from FIG. 3A to 3B with the remaining illustrated tasks (even-numbered reference character tasks 312 through 326). Sine weighted time and cosine weighted time values are determined for the second triggering event. The sine weighted time and cosine weighted time are summed together to determine a trigger time for the second triggering event at pixel i. User control is provided, such as a camera, for visual verification. The object (such as a target), the distance to the target, and the time to the target are displayed on the visual display screen for visual verification by a user. The method continues by incrementing to the next pixel until all pixels are sampled.

In embodiments, the second triggering event is a trigger signal instructing the photodetector elements to sample the sine wave, cosine wave, sine wave indexer, and cosine wave indexer. In some embodiments, the sampling task converts the sine wave from analog to digital. Likewise, in some embodiments, the sampling task converts the cosine wave from analog to digital. Since the sine wave indexer and the cosine wave indexer are digital, the indexers are copied.

In embodiments, the determination of the sine weighted time includes electronically determining the arc sine, $A^{sin}$, of said sine wave. A sine weight weighting factor, $G^{sin}$, is determined by one minus the sine wave amplitude squared, $G^{sin}=1-(w^{sin}[i])^2$. Bias and scale values for the sine wave indexer are electronically determined. The bias for the sine wave indexer is determined by $B^{sin}=Bias^{sin}[x^{sin}[i]]$. The scale for the sine wave indexer is determined by $S^{sin}=Scale^{sin}[x^{sin}[i]]$. The sine weighted time is then determined by $T^{sin}=B^{sin}+(S^{sin}\times A^{sin})$.

Likewise, the determination of the cosine weighted time includes electronically determining the arc cosine, $A^{cos}$, of the cosine wave. A cosine weight weighting factor, $G^{cos}$, is determined by one minus the cosine wave amplitude squared, $G^{cos}=1-(w^{cos}[i])^2$. Bias and scale for the cosine wave indexer are electronically determined. The bias for the cosine wave indexer is determined by $B^{cos}=Bias^{cos}[x^{cos}[i]]$. The scale for the cosine wave indexer is determined by $S^{cos}=Scale^{cos}[x^{cos}[i]]$. The cosine weighted time is then determined by $T^{cos}=B^{cos}+(S^{cos}\times A^{cos})$. The sine weighted time and the cosine weighted time are summed to determine the trigger time at pixel i, $T_i$, by $T_i=(G^{sin}\times T^{sin})+(G^{cos}\times T^{cos})$, as shown in reference characters 216C, 218C, and 320.

The display monitor (visual display screen) 10 is a tangible medium. Other tangible outputs are possible without detracting from the merits or generality of embodiments of the invention. As such, in the embodiments, the tangible outputs may be shown and/or represented as a visual display screen depiction, hard copy printouts, as well as other media using the information such as, for example, a computer having computer-readable instructions that is configured to use output from embodiments of the invention. The output may be used in programs using the output such as, for example, in shape-matching systems.

While this technology is primarily described using LADAR, other energy sensor systems such as RADAR, SONAR, and LIDAR can also be simulated using this technology. OpenGL is a software interface to computer graphics hardware and can be used for practicing embodiments of the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for increasing the accuracy in spatially local dimensioning for visual verification of target recognition, comprising:
   providing a system to recognize a target, said system, comprising:
      a control processing unit (CPU) having electronic memory;
      a graphics processing unit (GPU) electronically-connected to said CPU;
      a LADAR sensor associated with a navigation unit, said LADAR sensor having position and orientation geometry;
      a pulse timer associated with said LADAR sensor, said pulse timer having position and orientation geometry relative to said LADAR sensor;
   simultaneously, at time $t_0=0$, generating a sine wave, a cosine wave, a sine wave indexer, and a cosine wave indexer with said pulse timer;
   generating a laser pulse at said target, said laser pulse having an outgoing laser pulse transmission and a laser bounceback from said target, wherein said time $T_0$ is the time of said outgoing laser pulse transmission;
   detecting said outgoing laser pulse transmission, said outgoing laser pulse transmission causing a first triggering event;
   receiving said laser bounce back with said LADAR sensor at time $T_i$ and initiating a second triggering event;
   obtaining time for said second triggering event and initiating sampling of said sine wave, said cosine wave, said sine wave indexer, and said cosine wave indexer;
   electronically-determining sine weighted time and cosine weighted time for said second triggering event, and summing said sine weighted time and said cosine weighted time to determine trigger time at pixel i;
   electronically-determining distance to said target at said pixel i; and
   displaying said target, said distance to said target, and said trigger time at pixel i on a visual display screen for visual verification by a user.

2. The method according to claim 1, wherein said sine wave is an analog signal, said cosine wave is an analog signal 90 degrees out of phase from said sine wave, said sine wave indexer is a digital counter in sync with said sine wave, and said cosine wave indexer is a digital counter in sync with said with said cosine wave.

3. The method according to claim 1, wherein said second triggering event is a trigger signal instructing said CPU to sample said sine wave, said cosine wave, said sine wave indexer, and said cosine wave indexer.

4. The method according to claim 1, wherein said laser bounce back is return energy from said target.

5. The method according to claim 2, said sampling task, further comprising:
   converting said sine wave from analog to digital; and
   converting said cosine wave from analog to digital.

6. The method according to claim 1, said determination of sine weighted time, further comprising:
   electronically-determining the arc sine, $A^{sin}$, of said sine wave;
   electronically-determining sine weight weighting factor, $G^{sin}$, wherein said sine weighting factor is one minus the wave amplitude squared, $G^{sin}=1-(w^{sin}[i])^2$;
   electronically-determining bias and scale values for said sine wave indexer;

wherein said bias for said sine wave indexer, $B^{sin}=Bias^{sin}[x^{sin}[i]]$;

wherein said scale for said sine wave indexer, $S^{sin}=Scale^{sin}[x^{sin}[i]]$;

wherein said sine weighted time, $T^{sin}=B^{sin}+(S^{sin} \times A^{sin})$.

7. The method according to claim 6, said sampling task, further comprising:

electronically-determining the arc cosine, $A^{cos}$, of said cosine wave;

electronically-determining cosine weight weighting factor, $G^{cos}$, wherein said cosine weighting factor is one minus the wave amplitude squared, $G^{cos}=1-(w^{cos}[i])^2$;

electronically-determining bias and scale values for said cosine wave indexer;

wherein said bias for said cosine wave indexer, $B^{cos}=Bias^{cos}[x^{cos}[i]]$;

wherein said scale for said cosine wave indexer, $S^{cos}=Scale^{cos}[x^{cos}[i]]$;

wherein said cosine weighted time, $T^{cos}=B^{cos}+(S^{cos} \times A^{cos})$.

8. The method according to claim 7, wherein summing of said sine weighted time and said cosine weighted time to determine said trigger time at pixel i, $T_i$, wherein $T_i=(G^{sin} \times T^{sin})+(G^{cos} \times T^{cos})$.

9. The method according to claim 1, further comprising a control camera in communication with said GPU.

10. The method according to claim 9, further comprising providing user control of the position and orientation of said control camera.

* * * * *